United States Patent
Yamazaki et al.

(10) Patent No.: US 10,547,068 B2
(45) Date of Patent: Jan. 28, 2020

(54) SOLID OXIDE FUEL CELL SYSTEM AND METHOD OF CONTROLLING THE SAME

(71) Applicant: NISSAN MOTOR CO., LTD., Yokohama-shi, Kanagawa (JP)

(72) Inventors: Tetsushi Yamazaki, Kanagawa (JP); Tatsuya Yaguchi, Kanagawa (JP); Takeshi Shiomi, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 16/064,760

(22) PCT Filed: Dec. 8, 2016

(86) PCT No.: PCT/JP2016/086632
§ 371 (c)(1),
(2) Date: Jun. 21, 2018

(87) PCT Pub. No.: WO2017/110513
PCT Pub. Date: Jun. 29, 2017

(65) Prior Publication Data
US 2018/0375127 A1  Dec. 27, 2018

(30) Foreign Application Priority Data
Dec. 25, 2015 (JP) .................. 2015-254188

(51) Int. Cl.
*H01M 8/04228* (2016.01)
*H01M 8/04303* (2016.01)
(Continued)

(52) U.S. Cl.
CPC ... *H01M 8/04228* (2016.02); *H01M 8/04303* (2016.02); *H01M 8/04365* (2013.01); *H01M 8/04753* (2013.01)

(58) Field of Classification Search
CPC ......... H01M 8/04228; H01M 8/04303; H01M 8/04365; H01M 8/04753; H01M 8/0432; H01M 8/04559; H01M 2008/1293
See application file for complete search history.

(56) References Cited

U.S. PATENT DOCUMENTS

| 4,657,828 A | 4/1987 | Tajima |
| 2005/0136304 A1* | 6/2005 | Pettit ................. H01M 8/04022 429/441 |

(Continued)

FOREIGN PATENT DOCUMENTS

| JP | 59154775 A | * | 9/1984 | ........ H01M 8/04089 |
| JP | 61-233976 A | | 10/1986 | |

(Continued)

OTHER PUBLICATIONS

EPO website Machine Translation of JP-2012221563-A (Year: 2012).*

*Primary Examiner* — Gregg Cantelmo
(74) *Attorney, Agent, or Firm* — Foley & Lardner LLP

(57) ABSTRACT

A solid oxide fuel cell system includes a solid oxide fuel cell, a combustor disposed in a cathode gas supply line of the fuel cell, a fuel supply unit configured to supply a fuel to the combustor, and a cathode gas supply unit configured to supply a cathode gas to the cathode gas supply line. The system further includes a stop control unit configured to perform a stop control of the fuel cell, which includes a control that sets a cathode gas supply amount from the cathode gas supply unit to a predetermined amount and a control that supplies the fuel from the fuel supply unit in a supply amount corresponding to the cathode gas supply amount.

17 Claims, 8 Drawing Sheets

(51) Int. Cl.
*H01M 8/0432* (2016.01)
*H01M 8/04746* (2016.01)

(56) References Cited

U.S. PATENT DOCUMENTS

| | | | | |
|---|---|---|---|---|
| 2007/0259224 | A1* | 11/2007 | Tung | H01M 8/04007 429/429 |
| 2010/0304253 | A1* | 12/2010 | Crumm | H01M 8/04343 429/432 |
| 2015/0086887 | A1* | 3/2015 | Matsuo | H01M 8/04231 429/423 |

FOREIGN PATENT DOCUMENTS

| | | | | | |
|---|---|---|---|---|---|
| JP | 01176667 | A | * | 7/1989 | H01M 8/04223 |
| JP | 2006147250 | A | * | 6/2006 | H01M 8/04089 |
| JP | 2007-311072 | A | | 11/2007 | |
| JP | 2012221563 | A | * | 11/2012 | H01M 8/0612 |
| JP | 2013-157134 | A | | 8/2013 | |
| JP | 2013222595 | A | * | 10/2013 | |
| JP | 2014-22299 | A | | 2/2014 | |
| JP | 2014-68490 | A | | 4/2014 | |
| WO | WO-2012137564 | A1 | * | 10/2012 | H01M 8/0612 |

\* cited by examiner

SOLID OXIDE FUEL CELL SYSTEM AND METHOD OF CONTROLLING THE SAME

TECHNICAL FIELD

The present invention relates to a solid oxide fuel cell system and a method of controlling the solid oxide fuel cell system.

BACKGROUND ART

JP2014-68490A discloses a fuel cell system having fuel cells connected to a power supply line that connects a vehicle battery and a motor to each other. In addition, JP2014-68490A proposes using solid oxide fuel cells having conversion efficiency higher than that of conventional solid polymer fuel cells as vehicle-mounted fuel cells. However, in order to stop this fuel cell system, it is necessary to lower a fuel cell output voltage (open circuit voltage) to a voltage safe to touch a human body (target voltage). For this reason, in the related art, a discharge circuit is installed in the fuel cell, and supply of a cathode gas is stopped in the event of a system stop, so that the open circuit voltage is forcibly lowered by driving the discharge circuit.

SUMMARY OF INVENTION

However, in a case where the fuel cells are discharged by using the discharge circuit, oxygen of a cathode is consumed due to the discharge operation, and an oxygen partial pressure around a cathode electrode decreases. However, considering an entire passage used to supply the cathode gas to the fuel cells, the oxygen remains at a high partial pressure except the vicinity of the cathode electrode. Therefore, even after the discharge operation of the fuel cells, the oxygen inside the passage diffuses around the cathode electrode, so that the open circuit voltage increases again. Therefore, it was necessary to repeatedly discharge the fuel cells until the open circuit voltage is converged to the target voltage.

As the oxygen partial pressure around the cathode electrode becomes equal to or lower than a predetermined value, starvation occurs in the cathode electrode, and the cathode electrode is deteriorated (structural alteration). Therefore, it is necessary to repeat the discharge operation to prevent the oxygen partial pressure around the cathode electrode from becoming equal to or lower than a predetermined partial pressure in order to avoid deterioration of the cathode electrode. As a result, a lot of time is necessary to converge the open circuit voltage of the fuel cells to the target voltage.

It is therefore an object of the present invention to provide a solid oxide fuel cell system configured to converge a release voltage of the fuel cells to the target voltage within a short time while avoiding deterioration of the cathode electrode in a stop control of the solid oxide fuel cells, and a method of controlling the solid oxide fuel cell system.

A solid oxide fuel cell system according to one aspect of the present invention includes a solid oxide fuel cell, a combustor disposed in a cathode gas supply line of the fuel cell, a fuel supply unit configured to supply a fuel to the combustor, and a cathode gas supply unit configured to supply a cathode gas to the cathode gas supply line. The system further includes a stop control unit configured to perform a stop control of the fuel cell, which includes a control that sets a cathode gas supply amount from the cathode gas supply unit to a predetermined amount and a control that supplies the fuel from the fuel supply unit in a supply amount corresponding to the cathode gas supply amount.

DESCRIPTION OF EMBODIMENTS

Hereinafter, embodiments of the present invention will be described with reference to the accompanying drawings.

Configuration of Fuel Cell System

Figure 1:
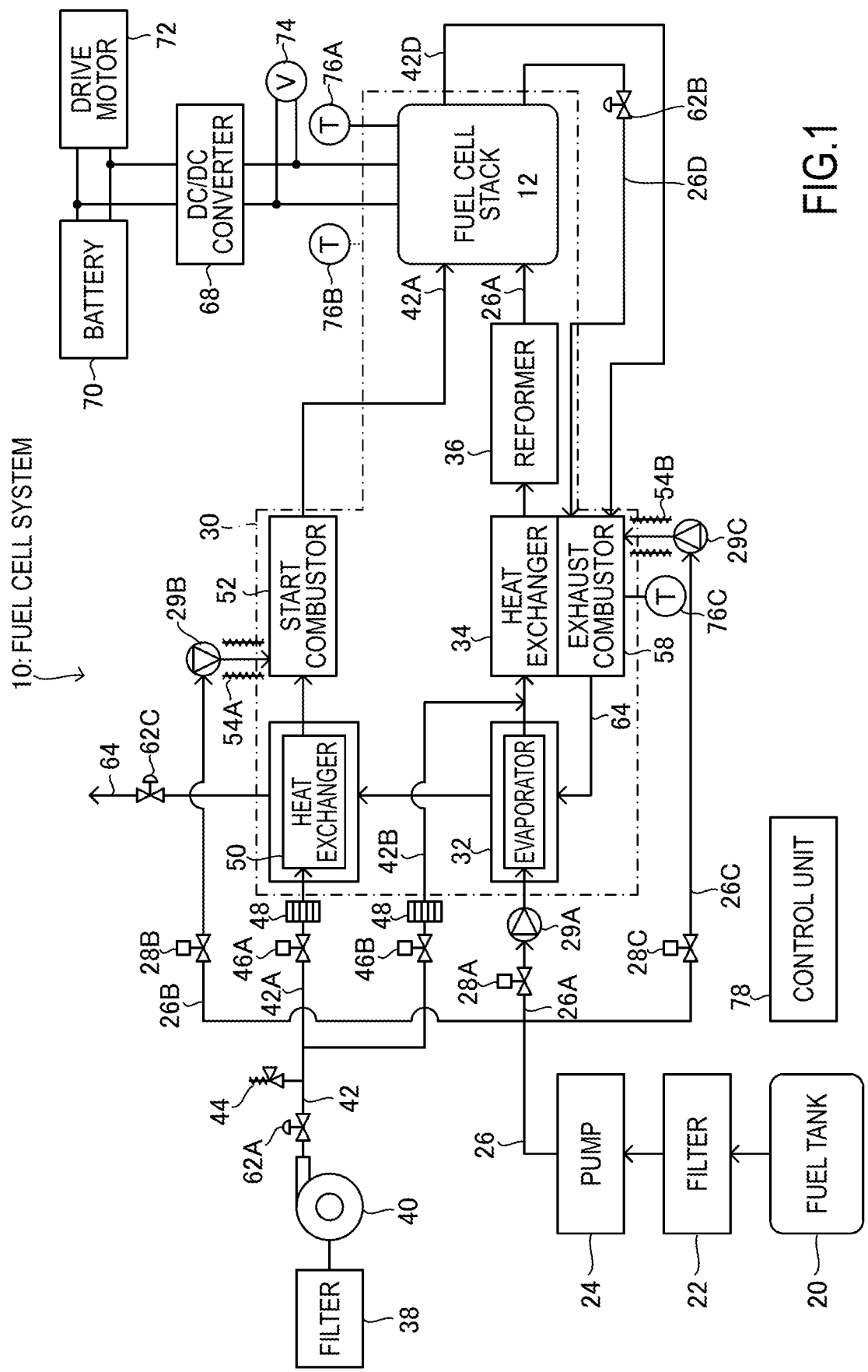
FIG. 1 is a block diagram illustrating main components of a fuel cell system according to a first embodiment.

FIG. 1 is a block diagram illustrating main components of a fuel cell system according to a first embodiment. A fuel cell system 10 (solid oxide fuel cell system) according to the first embodiment includes a fuel supply system that supplies an anode gas (fuel gas) to a fuel cell stack 12, a warm-up system that warms up the fuel cell stack 12, an air supply system that supplies a cathode gas to the warm-up system and supplies air (reformation air) necessary to reform a reformation fuel to the fuel supply system, an exhaust system that evacuates an anode off-gas and a cathode off-gas discharged from the fuel cell stack 12, and a drive system that obtains power from the fuel cell stack 12.

The fuel supply system has a fuel tank 20, a filter 22, a pump 24, an evaporator 32, a heat exchanger 34, a reformer 36, and the like. The warm-up system has a start combustor 52 and the like. The air supply system has a filter 38, a compressor 40, a heat exchanger 50, and the like. The exhaust system has an exhaust combustor 58 and the like. The drive system has a DC/DC converter 68, a battery 70, a drive motor 72, and the like. The fuel cell system 10 has a control unit 78 that controls operations of the entire system.

Out of the aforementioned components, the fuel cell stack 12, the evaporator 32, the heat exchanger 34, the reformer 36, the heat exchanger 50, the start combustor 52, and the exhaust combustor 58 are housed in a thermal insulation member 30 to reduce release of heat to the outside and suppress each temperature decrease during power generation control.

The fuel cell stack 12 is a solid oxide fuel cell (SOFC) in which cells are stacked and the cell is obtained by sandwiching an electrolyte layer made of a solid oxide such as ceramic between an anode electrode (fuel electrode) and a cathode electrode (air electrode). In addition, the anode of the fuel cell stack 12 is supplied with an anode gas, and the cathode is supplied with a cathode gas.

Here, it is assumed that the anode includes a passage (manifold) in the fuel cell stack 12 configured to supply the anode gas to the anode electrode, and a passage (manifold) in the fuel cell stack 12 configured to discharge the anode off-gas reacted in the anode electrode as well as the anode electrode constituting the fuel cell stack 12. Similarly, it is assumed that the cathode includes a passage (manifold) in the fuel cell stack 12 configured to supply the cathode gas to the cathode electrode, and a passage (manifold) in the fuel cell stack 12 configured to discharge the cathode off-gas reacted in the cathode electrode as well as the cathode electrode constituting the fuel cell stack 12.

In the fuel cell stack 12, power is generated by reacting hydrogen contained in the anode gas and oxygen contained in the cathode gas, and the anode off-gas and the cathode off-gas generated from the reaction are discharged. In addition, a temperature sensor 76A for measuring a temperature of the fuel cell stack 12 is installed in the fuel cell stack 12. The temperature sensor 76B measures or estimates an atmospheric temperature of the fuel cell stack 12. The temperature sensor 76B is installed in an exterior of the fuel cell stack 12, for example, on an inner side of the thermal insulation member 30 or the like.

The fuel cell stack 12 is connected to a passage 26A configured to supply the anode gas to the anode of the fuel cell stack 12, a passage 42A configured to supply the combustion gas to the cathode of the fuel cell stack 12 during a warm-up operation and supplying the cathode gas to the cathode during a power generation control, a passage 26D configured to introduce the anode off-gas (fuel off-gas) discharged from the anode of the fuel cell stack 12 to the exhaust combustor 58, and a passage 42D configured to introduce the cathode off-gas (oxidation off-gas) discharged from the cathode of the fuel cell stack 12 to the exhaust combustor 58. A flowpath cut-off valve 62B is installed in the passage 26D. The flowpath cut-off valve 62B opens the passage 26D during a power generation control of the fuel cell stack 12, and closes the passage 26D during a warm-up control and a stop control of the fuel cell system 10 described below.

The fuel tank 20 stores a reformation fuel (fuel), for example, consisting of a liquid obtained by mixing ethanol and water. The pump 24 suctions the reformation fuel, supplies the reformation fuel to the fuel supply system at a predetermined pressure, and supplies the combustion fuel (similar to the reformation fuel) to the warm-up system. The filter 22 is disposed between the fuel tank 20 and the pump 24 to remove impurities contained in the reformation fuel suctioned to the pump 24.

The passage 26 configured to supply the reformation fuel from the fuel tank 20 is branched to a passage 26A for supplying the reformation fuel to the evaporator 32, a passage 26B for supplying the combustion fuel to the start combustor 52, and a passage 26C for supplying the combustion fuel to the exhaust combustor 58. The passage 26A has a throttle 28A (reformation fuel supply unit) capable of opening or closing the flow path of the passage 26A and adjusting a reformation fuel supply amount. Similarly, the passage 26B has a throttle 26B (fuel supply unit), and the passage 26C has a throttle 28C.

The throttle 28A closes the passage 26A during a warm-up control of the fuel cell system 10, but opens the passage 26A in the end of the warm-up control by opening the passage 26A at a predetermined opening degree to circulate the reformation fuel through the injector 29A. The throttle 28B opens the passage 26B at a predetermined opening degree during a warm-up control of the fuel cell system 10 to circulate the combustion fuel through the injector 29B, and closes the passage 26B in the end of the warm-up control. The throttle 28C opens the passage 26C at a predetermined opening degree to circulate the combustion fuel through the injector 29C during the warm-up control of the fuel cell system 10, and closes the passage 26C in the end or in the middle of the warm-up control.

The evaporator 32 is to evaporate the reformation fuel using the heat of the exhaust gas discharged from the exhaust combustor 58. The heat exchanger 34 is supplied with the heat from the exhaust combustor 58 and further heats the evaporated reformation fuel for reformation in the reformer 36.

The reformer 36 reforms the reformation fuel into the anode gas containing hydrogen on the basis of a catalytic reaction and supplies the anode gas to the fuel cell stack 12 (anode). The reformer 36 is supplied with the reformation air (similar to the cathode gas) from a passage 42B described below and reforms the reformation fuel into the anode gas on the basis of a catalytic reaction.

The compressor 40 (cathode gas supply unit) receives external air through the filter 38 and supplies the air (cathode gas) to the fuel cell stack 12 or the like. A relief valve 44 is installed in the passage 42 for supplying the air discharged from the compressor 40. If the pressure in the passage 42 exceeds a predetermined value, the passage 42 is opened to prevent a predetermined level or higher of a load from being applied to the compressor 40. In addition, an air supply cut-off valve 62A is installed in an upstream position from the relief valve 44 in the passage 42. The air supply cut-off valve 62A normally opens the passage 42, but closes the passage 42 in a final stage of the stop control of the fuel cell system 10. The passage 42 is branched into a passage 42A for supplying a cathode gas (air) to the heat exchanger 50 and a passage 42B for supplying the reformation air to the heat exchanger 34 (reformer 36).

A throttle 46A (cathode gas supply unit) is installed in the passage 42A (cathode gas supply line), so that the cathode gas supply amount can be adjusted under control of the control unit 78. Similarly, a throttle 46B is installed in the passage 42B, so that the reformation air supply amount can be adjusted under control of the control unit 78. Furthermore, a backfire prevention device 48 for preventing flame is installed in a downstream position of the air from each throttle in each passage.

The heat exchanger 50 heats the cathode gas using the heat of the exhaust gas discharged from the exhaust combustor 58.

The start combustor 52 generates a combustion gas for warming up the fuel cell stack 12 during the warm-up control of the fuel cell system 10. The start combustor 52 is supplied with the cathode gas heated by the heat exchanger 50 and the combustion fuel supplied from the injector 29B and heated by the electric heater 54A, and the cathode gas and the combustion fuel are mixed. In addition, a mixture of the cathode gas and the combustion fuel is ignited by an igniter included in the start combustor 52 to generate a high-temperature combustion gas. This combustion gas is supplied to the cathode of the fuel cell stack 12 through the passage 42A.

During the power generation control, the exhaust combustor 58 mixes the anode off-gas supplied from the passage 26D and the cathode off-gas supplied from the passage 42D, catalytically combusts the gas mixture to generate the exhaust gas containing carbon dioxide or water as main components, and transfers the heat generated through the catalytic combustion to the heat exchanger 34 or the like. In addition, during the warm-up control, the exhaust combustor 58 mixes the combustion fuel supplied from the injector 29C and heated by the electric heater 54B and the combustion gas (containing oxygen) supplied from the passage 42D, combusts the mixture to generate the exhaust gas, and warms up the exhaust combustor 58 using this combustion to a temperature at which catalytic combustion can be performed. In addition, the exhaust combustor 58 is connected to the exhaust passage 64 for discharging the exhaust gas subjected to the combustion, and the exhaust passage 64 is connected to a muffler (not shown) through the evaporator 32 and the heat exchanger 50. Therefore, the evaporator 32 and the heat exchanger 50 are heated by the exhaust gas. Furthermore, an exhaust cut-off valve 62C is installed in a rear stage of the exhaust passage 64. The exhaust cut-off valve 62C normally opens the exhaust passage 64 and closes the exhaust passage 64 in the final stage of the stop control of the fuel cell system 10. Note that a temperature sensor 76C for measuring a temperature of the exhaust combustor 58 (combustion catalyst) is installed in the exhaust combustor 58.

The DC/DC converter 68 is connected to the fuel cell stack 12 and boosts an output voltage of the fuel cell stack 12 to supply electric power to the battery 70 or the drive motor 72. The battery 70 is charged with the electric power supplied from the DC/DC converter 68 and supplies the electric power to the drive motor 72. The drive motor 72 is connected to the battery 70 and the DC/DC converter 68 through an inverter (not shown) to serve as a power source of a vehicle. The drive motor 72 generates regenerative power during a vehicle braking operation, and this regenerative power can be charged in the battery 70. Note that a voltage meter 74 is connected to a line that connects the fuel cell stack 12 and the DC/DC converter 68, and the voltage meter 74 (voltage detection unit) measures a voltage (open circuit voltage) of the fuel cell stack 12.

The control unit 78 has a general-purpose electric circuit provided with a microcomputer, a microprocessor, and a central processing unit (CPU) and peripherals to execute a process for controlling the fuel cell system 10 by executing a particular program. In addition, the control unit 78 may perform a drive/stop control (ON/OFF control) for the components constituting the fuel cell system 10. As described below, a control of the fuel cell system 10 performed by the control unit 78 includes a warm-up control for warming up the fuel cell stack 12, a normal power generation control for performing normal power generation, and a stop control for stopping the system. Furthermore, the control unit 78 may control a reformation fuel supply amount (flow rate) by controlling the opening degree of the throttle 28A (and the throttles 28B and 28C) and control the combustion fuel supply amount by controlling the opening degrees of the throttles 28B and 28C. Moreover, the control unit 78 may control the cathode gas supply amount by controlling the opening degree of the throttle 46A and control the reformation air supply amount by controlling the opening degree of the throttle 46B.

Warm-Up Control of Fuel Cell System

The warm-up control of the fuel cell system 10 starts on the occasion of an ignition-on manipulation of a driver (by turning on a vehicle start key). The warm-up control is performed by supplying the combustion gas from the start combustor 52 to the fuel cell stack 12 and warming up the fuel cell stack 12. However, in this case, regarding the oxygen partial pressure of the combustion gas, it is necessary to consider a supply ratio between the cathode gas and the combustion fuel, that is, an excess air factor $\lambda$ such that the combustion gas has a temperature equal to or lower than a heat-resisting temperature of the fuel cell stack 12.

The excess air factor $\lambda$ (including $\lambda 0$ and $\lambda 1$ described below) can be defined a value that depends on "(cathode gas supply amount)/(combustion fuel supply amount)". The excess air factor $\lambda$ becomes "1" considering the cathode gas supply amount supplied to the start combustor 52 and the maximum combustion fuel supply amount combustible by the cathode gas corresponding to this supply amount. When the excess air factor $\lambda$ is equal to "1", the oxygen partial pressure of the combustion gas becomes zero, but the combustion gas has the highest temperature. However, as the excess air factor $\lambda$ increases over "1", the oxygen partial pressure increases, and the temperature of the combustion gas decreases reversely.

Therefore, a suitable range of the excess air factor $\lambda 0$ for the warm-up control becomes "$1 < \lambda t \leq \lambda 0$" where "$\lambda t$" denotes an excess air factor for obtaining the combustion gas of the oxygen partial pressure corresponding to the heat-resisting temperature of the fuel cell stack 12. Note that, since the excess air factor $\lambda a$ for implementing the oxygen partial pressure at which deterioration of the cathode electrode of the fuel cell stack 12 is avoided is smaller than the excess air factor $\lambda t$, it is not necessary to consider that excess air factor $\lambda a$ in the warm-up control.

The generation of the combustion gas using the start combustor 52 is terminated as the warm-up control is terminated. In addition, the air passing through the heat exchanger 50 and the start combustor 52 is continuously used as the cathode gas and is supplied to the fuel cell stack 12, so that process advances to the normal power generation control.

Warm-Up Control Sequence of Fuel Cell System

A warm-up control sequence of the fuel cell system according to the first embodiment will be described with reference to the flowchart of FIG. 2.

Figure 2:
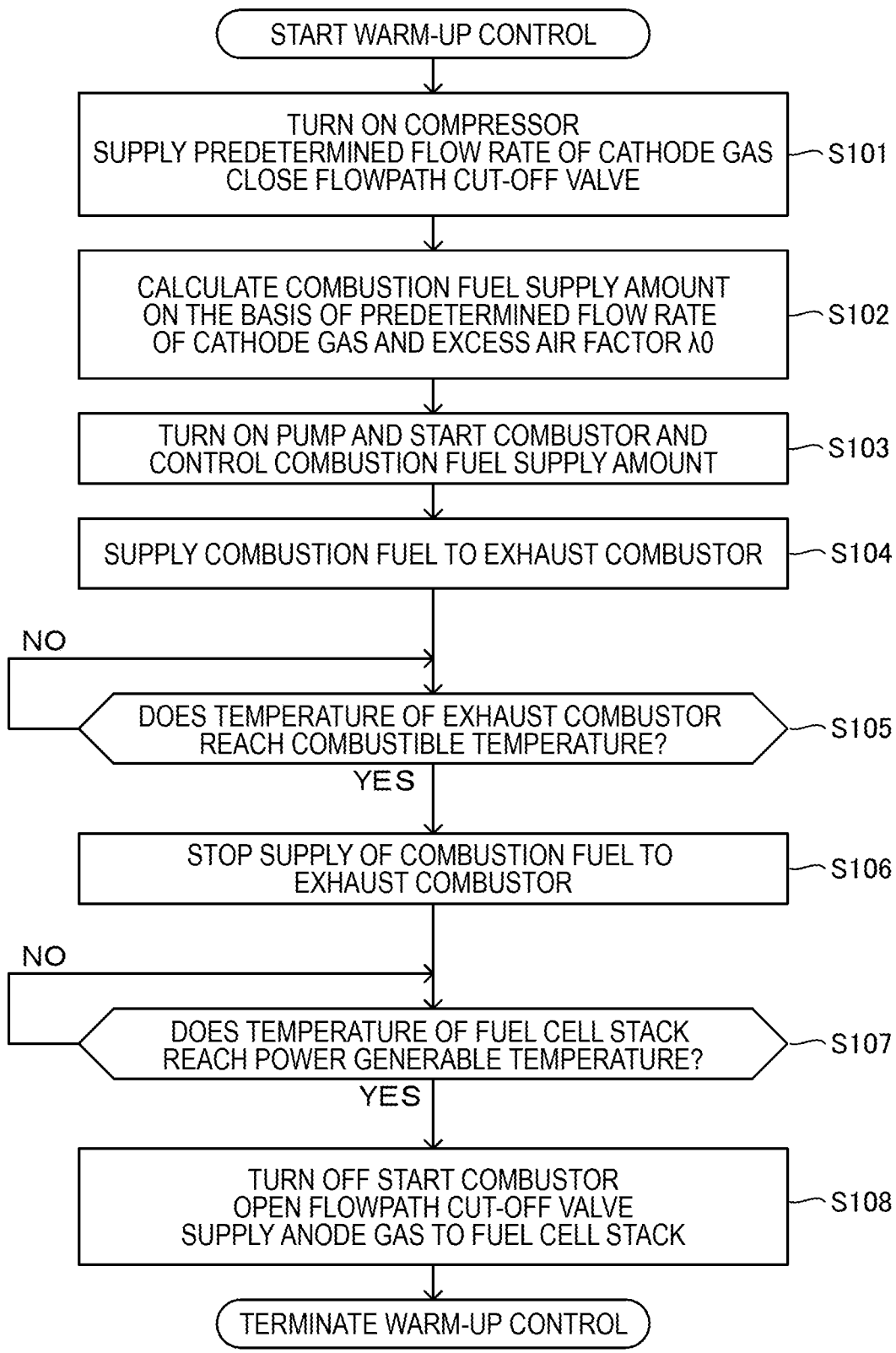
FIG. 2 is a flowchart illustrating a warm-up control sequence of the fuel cell system according to the first embodiment.

As illustrated in FIG. 2, first, as the system starts the warm-up control, the control unit 78 turns on the compressor 40 and the throttle 46A in step S101. As a result, a predetermined cathode gas supply amount circulates through the passage 42A. In addition, in step S101, the control unit 78 closes the passage 26D by closing the flowpath cut-off valve 62B.

In step S102, the control unit 78 calculates the combustion fuel supply amount on the basis of the cathode gas supply amount calculated from the opening degree of the throttle 46A and the excess air factor $\lambda 0$.

In step S103, the control unit 78 turns on the pump 24, the throttle 28B, and the start combustor 52 and controls the opening degree of the throttle 28B depending on the combustion fuel supply amount. As a result, a gas mixture of the cathode gas and the combustion fuel is generated in the start combustor 52 with an excess air factor $\lambda 0$, and the start combustor 52 ignites the gas mixture, so that the combustion gas (containing oxygen) having a temperature equal to or lower than the heat-resisting temperature of the fuel cell stack 12 is supplied to the fuel cell stack 12, and the fuel cell stack 12 is warmed up (heated) by the combustion. In addition, the combustion gas passing through the fuel cell stack 12 reaches the exhaust combustor 58 through the passage 42D to heat the exhaust combustor 58. Furthermore, the components such as the heat exchanger 34 and the reformer 36 placed inside the thermal insulation member 30 is heated by the heat transferred from the combustion gas. Moreover, the combustion gas passing through the fuel cell stack 12 is introduced into the exhaust combustor 58 through the passage 42D, and the combustion gas (exhaust gas) passing through the exhaust combustor 58 passes through the evaporator 32 and the heat exchanger 50 via the exhaust passage 64 so as to heat the evaporator 32 and the heat exchanger 50.

In step S104, the control unit 78 turns on the throttle 28C so that the combustion fuel is supplied to the exhaust combustor 58 at a predetermined opening level. As a result, the exhaust combustor 58 is further heated by a catalytic reaction between the combustion fuel and the combustion gas (including oxygen), and this heat is transferred to the heat exchanger 34 and the like. Note that the exhaust gas generated by the catalytic reaction passes through the evaporator 32 and the heat exchanger 50 via the exhaust passage 64 so as to heat the evaporator 32 and the heat exchanger 50.

In step S105, the control unit 78 determines whether or not the temperature of the exhaust combustor 58 reaches a catalytic combustible temperature on the basis of the temperature measured by the temperature sensor 76C. If the control unit 78 determines YES in step S105, the control unit 78 turns off the throttle 28C to stop supply of the combustion fuel to the exhaust combustor 58 in step S106. As a result, the exhaust combustor 58 is continuously heated by the combustion gas thereafter.

In step S107, the control unit 78 determines whether or not the temperature of the fuel cell stack 12 reaches a power generable temperature which is a lower limit of the power generable temperature on the basis of the temperature detected by the temperature sensor 76A.

Here, it is also necessary to determine whether or not the temperatures of the evaporator 32, the heat exchanger 34, and the reformer 36 reach a temperature suitable for appropriately reforming the reformation fuel. However, such determination is not necessary if the time required for the evaporator 32, the heat exchanger 34, and the reformer 36 to reach the suitable temperature is earlier than the time required for the fuel cell stack 12 to reach the power generable temperature.

If the control unit 78 determines YES in step S107, the control unit 78 turns off the throttle 28B and the start combustor 52 to stop generation of the combustion gas in step S108. In addition, in step S108, the control unit 78 opens the passage 26C by opening the flowpath cut-off valve 62B and opens the passage 26A by turning on the throttles 28A and 46B.

As a result, the reformation fuel from the fuel tank 20 reaches the heat exchanger 34 through the injector 29A and the evaporator 32 with a predetermined supply amount depending on the opening degree of the throttle 28A. In addition, a predetermined reformation air supply amount is supplied to the heat exchanger 34 depending on the opening degree of the throttle 46B and is mixed with the reformation fuel. Furthermore, this gas mixture is introduced into the reformer 36 to reform the anode gas (fuel gas), and this anode gas is supplied to the fuel cell stack 12 (anode). Meanwhile, the cathode gas is continuously supplied from the passage 42A and is heated by the heat exchanger 50, so that the cathode gas (oxidization gas) is supplied to the fuel cell stack 12. In addition, as an electrochemical reaction between the anode gas and the cathode gas starts in the fuel cell stack 12, the warm-up control is terminated, and the process advances to the power generation control. Note that the anode off-gas passing through the fuel cell stack 12 can be introduced into the exhaust combustor 58 through the passage 26C because the cut-off valve 62 is opened.

Operation of Normal Power Generation Control of Fuel Cell System

Next, operations performed in the normal power generation control of the fuel cell system 10 will be described. In the normal power generation control of the system, first, the reformation fuel supplied from the fuel tank 20 is evaporated by the evaporator 32, and the evaporated reformation fuel is mixed with a predetermined reformation air supply amount and is heated by the heat exchanger 34. Then, the gas mixture of the heated reformation fuel and the reformation air is reformed to the anode gas in the reformer 36, and this anode gas is supplied to the anode of the fuel cell stack 12. Meanwhile, the cathode gas is heated by the heat exchanger 50 and is supplied to the cathode of the fuel cell stack 12 through the start combustor 52.

In the fuel cell stack 12 supplied with the anode gas and the cathode gas, an electromotive force is generated by an electrochemical reaction, and power is supplied to the DC/DC converter 68. In addition, the anode off-gas and the cathode off-gas used in the electrochemical reaction are introduced into the exhaust combustor 58. In addition, the exhaust combustor 58 combusts a mixture of the anode off-gas and the cathode off-gas to generate an exhaust gas, and the exhaust gas passes through the evaporator 32 and the heat exchanger 50 to heat them.

During driving of a vehicle, the anode gas supply amount (opening degrees of throttles 28A and 46B) and the cathode gas supply amount (opening degree of throttle 46A) change nearly linearly in proportion to the power required for the system (battery 70 and drive motor 72). However, the fuel cell stack 12 necessitates power for maintaining the fuel cell stack 12 in a generable state, that is, power for operating auxiliary machinery such as the pump 24 and the compressor 40. Therefore, even when power demanded for the fuel cell stack 12 is zero, the fuel cell stack 12 generates at least power for operating the auxiliary machinery as described above.

Stop Control of Fuel Cell System

The stop control of the fuel cell system 10 according to the first embodiment is performed by the control unit 78 (stop control unit). However, the stop control starts on the occasion of an ignition-off manipulation (by turning off the vehicle start key) performed by a driver after the vehicle stops, or as the battery 70 is fully charged, and the power generation request for the fuel cell stack 12 stops.

The stop control of the fuel cell stack 100 according to the first embodiment aims to decrease the open circuit voltage (voltage) of the fuel cell stack 12 to a voltage allowed in the stop operation. The allowed voltage is lower than the discharge request voltage (for example, 60 V) required by the fuel cell system 10 in the stop operation and is higher than a voltage (target voltage described below) at which deterioration of the cathode electrode of the fuel cell stack 12 is avoidable. In addition, the allowed voltage is a voltage safe to touch a human body.

The open circuit voltage of the fuel cell stack 12 depends on a difference of the oxygen partial pressure between the cathode and the anode. In addition, while power generation of the fuel cell stack 12 stops, the oxygen partial pressure of the cathode becomes nearly equal to that of the air, and the oxygen partial pressure of the anode is nearly zero. Therefore, the open circuit voltage may decrease by reducing the oxygen partial pressure of the cathode. The oxygen partial pressure of the cathode can be reduced by supplying the combustion gas used in the warm-up control to the cathode. However, as the oxygen partial pressure of the cathode becomes equal to or lower than a predetermined value, starvation may occur in the cathode electrode to generate deterioration (structural alteration) in some cases.

In this regard, the stop control according to the first embodiment is performed by stopping supply of the anode gas and supplying the combustion gas to the cathode of the fuel cell stack 12 using the start combustor 52. Note that, in the stop control, the power generation of the fuel cell stack 12 stops by turning off the DC/DC converter 68 in order to avoid the heat caused by the power generation.

Regarding the combustion gas, considering the excess air factor λa at which a lower limit of the oxygen partial pressure for avoiding deterioration of the cathode electrode of the fuel cell stack 12 is implemented, and the excess air factor λb at which an oxygen partial pressure for setting the open circuit voltage of the fuel cell stack 12 to the discharge request voltage is implemented, a suitable range of the excess air factor λ1 of the combustion gas becomes "1<λa≤λ1<λb". Meanwhile, since "λa" depends on the temperature T of the fuel cell stack 12 (cathode electrode), it can be expressed as "λa(T)". Therefore, since a suitable range of the excess air factor λ1 of the combustion gas changes depending on the temperature, it can be expressed as "1<λa(T)≤λ1(T)<λb". The excess air factor λa(T) tends to increase as the temperature of the fuel cell stack 12 increases. Therefore, in a case where the combustion gas is supplied to the cathode without supplying the anode gas, the open circuit voltage of the fuel cell stack 12 becomes a lower limit value V(λa(T)) for allowing a voltage value corresponding to a lower limit of the oxygen partial pressure at which deterioration of the cathode electrode is avoidable. However, this lower limit value V(λa(T)) increases as the temperature of the fuel cell stack 12 increases. Note that the temperature T of the fuel cell stack 12 at the start of the stop control depends on the power generation amount of the fuel cell stack 12 immediately before the end of the normal power generation control or the like.

Therefore, it is necessary to set the target voltage V such that the aforementioned open circuit voltage at the temperature T of the fuel cell stack 12 is not lower than the lower limit value V(λa(T)) of the open circuit voltage described above. Here, preferably, the target voltage V is set to "V(λ1(T))" as a function of the temperature T, and is set to be slightly higher than the lower limit value "V(λa(T))" described above at any temperature T.

Regarding the combustion gas, the fuel supply amount Fcf supplied to the start combustor 52 is set to "Fcf=y(λ1(T), Fcc)" depending on the cathode gas supply amount Fcc supplied to the cathode, the temperature T of the fuel cell stack 12, and the excess air factor λ1. According to the first embodiment, preferably, the cathode gas supply amount supplied to the start combustor 52 is set to the maximum value Fccmax by maximizing the output of the compressor 40 and the opening degree of the throttle 46A. In this case, the fuel supply amount becomes "Fcf=y(λ1(T), Fccmax)". As a result, it is possible to rapidly switch the passages 42A and 42D of the cathode gas to the combustion gas having a predetermined oxygen concentration and rapidly lower the open circuit voltage of the fuel cell stack 12.

In a case where the open circuit voltage of the fuel cell stack 12 decreases to the target value "V(λ1(T))", the pump 24 and the compressor 40 are turned off, and the air supply cut-off valve 62A and the exhaust cut-off valve 62C are closed. Then, the fuel cell stack 12 may be naturally cooled by heat radiation of the fuel cell stack 12.

Stop Control Sequence of Fuel Cell System

Figure 3:
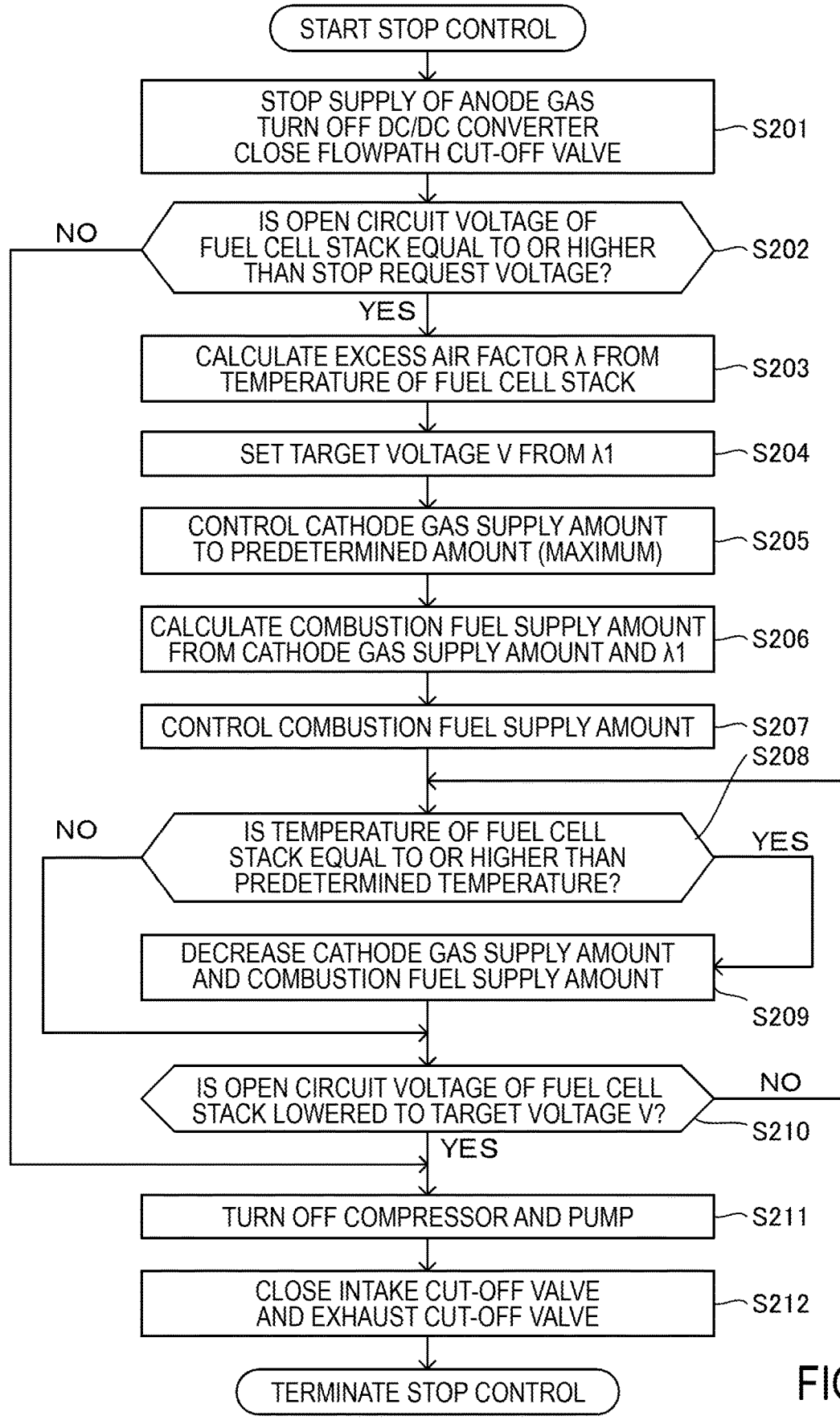
FIG. 3 is a flowchart illustrating a stop control sequence of the fuel cell system according to the first embodiment.

A stop control sequence of the fuel cell system 10 according to the first embodiment will be described with reference to the flowchart of FIG. 3. As the system starts the stop control, in step S201, the control unit 78 (stop control unit) turns off the throttle 28A (reformation fuel supply unit), throttle 46B (reformation air supply unit), and the DC/DC converter 68, and closes the flowpath cut-off valve 62B. As a result, since supply of the anode gas stops, and power generation of the fuel cell stack 12 also stops. In addition, by turning off the DC/DC converter 68, the fuel cell stack 12 is electrically insulated from the battery 70 and the drive motor 72, and a positive electrode and a negative electrode of the fuel cell stack 12 are opened. In addition, by closing the flowpath cut-off valve 62B, it is possible to suppress a reverse flow of the gas containing oxygen through the passage 26D so as to protect the anode electrode.

In step S202, the control unit 78 determines whether or not the open circuit voltage of the fuel cell stack 12 measured by the voltage meter 74 is equal to or higher than the discharge request voltage. If the control unit 78 determines YES in step S202, the process advances to the next step S203. Otherwise, if the control unit 78 determines NO, the process advances to step S209 described below.

In step S203, the control unit 78 calculates the excess air factor λ1(T) from the temperature (internal temperature) of the fuel cell stack 12 measured by the temperature sensor 76A. In step S204, the control unit 78 sets the target voltage V(λ1(T)) of the open circuit voltage of the fuel cell stack 12 on the basis of the excess air factor λ1(T).

In step S205, the control unit 78 controls the throttle 46A to a predetermined opening degree (maximum) in order to set the cathode gas supply amount Fcc to a predetermined amount (maximum). In step S206, the control unit 78 calculates the combustion fuel supply amount Fcf on the basis of the cathode gas supply amount Fcc (opening degree of throttle 46A) and the excess air factor λ1.

In step S207, the control unit 78 turns on the throttle 28B and the start combustor 52, and controls the opening degree of the throttle 28B depending on the heating amount fuel supply amount Fcf supplied to the start combustor 52. As a result, the start combustor 52 generates a combustion gas of the excess air factor λ1(T) and supplies the combustion gas to the cathode of the fuel cell stack 12 through the passage 42A. In addition, the oxygen partial pressure of the cathode decreases, and the open circuit voltage of the fuel cell stack 12 decreases to the target voltage V(λ1(T)). Furthermore, as the control unit 78 generates the combustion gas, the combustion gas flows through the passage 42A, the fuel cell stack 12, the passage 42D, and the exhaust passage 64.

In step S208, the control unit 78 determines whether or not the temperature of the fuel cell stack 12 measured by the temperature sensor 76A increases to a predetermined temperature or higher. If the control unit 78 determines YES in step S208, the cathode gas supply amount Fcc and the combustion fuel supply amount Fcf are reduced at a predetermined ratio (at the same ratio in both amounts), and the heat amount applied to the fuel cell stack 12 is reduced while maintaining the oxygen partial pressure of the combustion gas, so that the temperature of the fuel cell stack 12 decreases at least under a predetermined temperature in step S209. Note that the cathode gas supply amount Fcc and the combustion fuel supply amount Fcf may be determined on the basis of the heat radiation amount Q(T-Tc) described below (in the second embodiment). Otherwise, if the control unit 78 determines NO in step S209, the cathode gas supply amount Fcc and the combustion fuel supply amount Fcf are continuously maintained.

In step S210, the control unit 78 determines whether or not the open circuit voltage of the fuel cell stack 12 measured by the voltage meter 74 decreases to the target voltage V(λ1(T)). If the control unit 78 determines YES, the process advances to step S211. If the control unit 78 determines NO, the process returns to step S208.

Then, the control unit 78 turns off the compressor 40, the pump 24, and the start combustor 52 in step S211 and closes the air supply cut-off valve 62A and the exhaust cut-off valve 62C in step S212, so that the stop control is terminated. In this case, the passage 42A, the fuel cell stack 12, the passage 42D, and the exhaust passage 64 are maintained in an airtight state, and the oxygen partial pressure of the combustion gas is continuously maintained. Then, the fuel cell stack 122 is naturally cooled.

Note that, in the stop control, the anode gas may be continuously supplied to the fuel cell stack 12 while the throttles 28A and 46B are turned on. In this case, in step S201, the flowpath cut-off valve 62B is continuously opened. In addition, since the DC/DC converter 68 is turned off even when the anode gas is supplied to the anode of the fuel cell stack 12, no power is generated from the fuel cell stack 12 (no power is supplied). Meanwhile, in step S207 and thereafter, the combustion gas and the anode gas introduced into the exhaust combustor 58 are mixed, and the mixture is combusted to generate an exhaust gas. However, since the flowpath cut-off valve 62B is closed in step S212 as described above, the combustion of the exhaust combustor 58 also stops.

Figure 4:
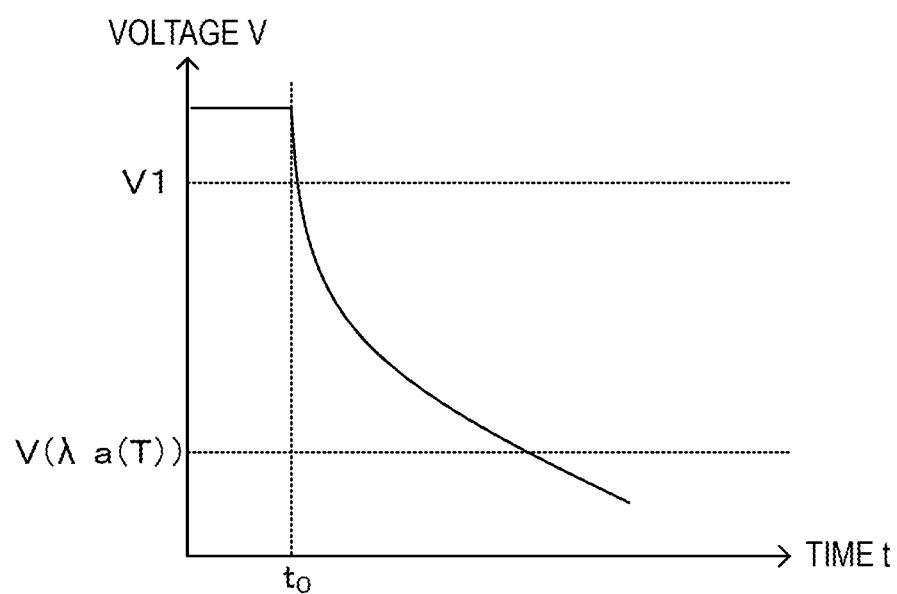
FIG. 4 is a diagram illustrating a voltage change by lowering an open circuit voltage of a fuel cell stack using a discharge circuit.
Figure 5:
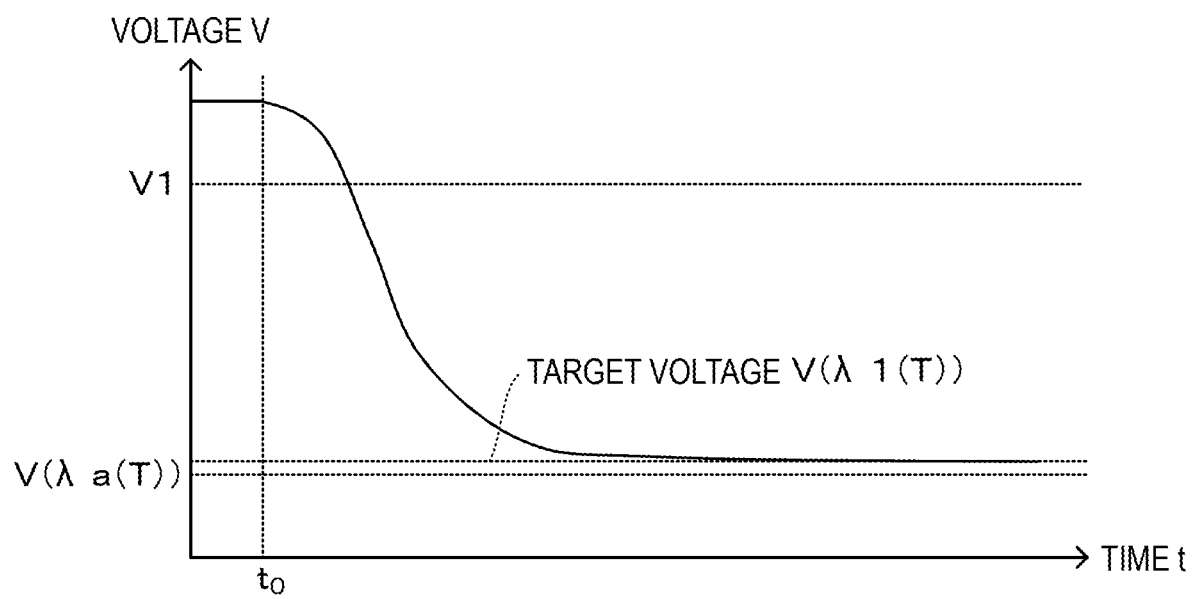
FIG. 5 is a diagram illustrating a voltage change by lowering the open circuit voltage of the fuel cell stack using a combustion gas.

FIG. 4 is a diagram illustrating a voltage change by lowering the open circuit voltage of the fuel cell stack using the discharge circuit. FIG. 5 is a diagram illustrating a voltage change by lowering the open circuit voltage of the fuel cell stack using the combustion gas. As illustrated in FIG. 4, if the open circuit voltage of the fuel cell stack 12 is equal to or higher than the discharge request voltage V1 (for example, 60 V) at the start of the stop control (timing t0) after the normal power generation control is terminated, the open circuit voltage of the fuel cell stack 12 is lowered in the stop control.

As illustrated in FIG. 4, as the open circuit voltage is lowered by the discharge circuit, oxygen around the cathode electrode is consumed, so that the oxygen concentration around the cathode electrode is reduced. The oxygen remains at a high partial pressure in the passage connected to the cathode of the fuel cell stack 12. However, a certain period of time elapses until the oxygen diffuses to the cathode electrode. As a result, the open circuit voltage of the fuel cell stack 12 decreases to "V(λa(T))" or lower regardless of the lower limit voltage "V(λa(T))" at which deterioration caused by starvation of the cathode electrode is avoidable, so that the cathode electrode is deteriorated.

However, as illustrated in FIG. 5, according to the first embodiment, the combustion gas having a predetermined oxygen partial pressure flows through the cathode of the fuel cell stack 12 and the passage configured to supply the cathode gas to the cathode. The combustion gas may be set to have an excess air factor λ1(T) at which the target temperature V(λ1(T)) slightly higher than "V(λa(T))" is implemented. Therefore, it is possible to converge the open circuit voltage of the fuel cell stack 12 to a value slightly higher than "V(λa(T))" while avoiding deterioration of the cathode electrode.

Effects of Fuel Cell System of First Embodiment

The fuel cell system 10 according to the first embodiment has the control unit 78 (stop control unit) that performs, as a stop control of the fuel cell stack 12 (fuel cell), a control for setting the cathode gas supply amount from the throttle 46A (cathode gas supply unit) to a predetermined amount (maximum) and a control for supplying the combustion fuel (combustion) supply amount corresponding to the cathode gas supply amount from the throttle 28B (fuel supply unit). That is, in the fuel cell system 10 and the method of controlling the same according to the first embodiment, as the stop control of the fuel cell stack 12 (fuel cell), the combustion fuel (fuel) and the cathode gas are supplied to the start combustor 52 (combustor) disposed in the passage 42A (cathode gas supply line) of the fuel cell stack 12 to generate the combustion gas, and the combustion gas is supplied to the fuel cell stack 12 (fuel cell). In addition, the cathode gas supply amount is set to a predetermined amount, and the combustion fuel (fuel) supply amount corresponding to the cathode gas supply amount is supplied to the start combustor 52 (combustor). As a result, a fuel gas having a predetermined oxygen partial pressure flows through the cathode of the fuel cell stack 12 and the passages communicating with the cathode. Therefore, it is possible to converge the open circuit voltage of the fuel cell stack 12 to the target voltage V within a short time without degrading the cathode electrode.

The control unit 78 (stop control unit) performs the stop control when the open circuit voltage (voltage) of the fuel cell stack 12 is equal to or higher than the discharge request voltage. As a result, it is not necessary to perform the stop control when the open circuit voltage at the start of the stop control is lower than the discharge request voltage. Therefore, it is possible to reduce a combustion fuel consumption amount accordingly.

The fuel cell system 10 has the air supply cut-off valve 62A installed in the passage 42 (cathode gas supply line) and the exhaust cut-off valve 62C installed in the exhaust passage 64 (exhaust line) configured to discharge the exhaust gas from the fuel cell stack 12 (fuel cell). The control unit 78 (stop control unit) stops the pump 24 (fuel supply unit) and the compressor 40 (cathode gas supply unit) and closes the air supply cut-off valve 62A and the exhaust cut-off valve 62C when the open circuit voltage (voltage) of the fuel cell stack 12 (fuel cell) decreases to a predetermined target voltage V lower than the discharge request voltage. As a result, after the stop control, the cathode and the anode are maintained in an airtight state, and the oxygen partial pressure is continuously maintained. Therefore, it is possible to avoid deterioration of the cathode electrode and the anode electrode even when the fuel cell stack 12 is naturally cooled thereafter.

The fuel cell system 10 has the temperature sensor 76A (temperature detection unit) configured to estimate or detect a temperature of the fuel cell stack 12 (fuel cell). The control unit 78 (stop control unit) reduces the cathode gas supply amount and the combustion fuel (fuel) supply amount when the temperature of the fuel cell stack 12 (fuel cell) increases over a predetermined temperature. As a result, it is possible to avoid a temperature increase of the fuel cell stack 12 in the stop control.

The predetermined temperature is set to the heat-resisting temperature of the fuel cell stack 12 (fuel cell). As a result, it is possible to avoid a damage of the fuel cell stack 12.

The control unit 78 (stop control unit) maximizes the cathode gas supply amount from the throttle 46A (cathode gas supply unit). As a result, it is possible to rapidly lower the open circuit voltage of the fuel cell stack 12 by rapidly supplying the combustion gas to the anode of the fuel cell stack 12 and the passages 26A and 26D connected to the anode.

The control unit 78 (stop control unit) controls the supply amount of the combustion fuel (fuel) on the basis of the excess air factor $\lambda1(T)$ corresponding to the temperature of the fuel cell stack 12 (fuel cell). As a result, it is possible to set the target temperature $V(\lambda1(T))$ of the open circuit voltage depending on the temperature of the fuel cell stack 12.

The excess air factor $\lambda1(T)$ is set such that the oxygen partial pressure in the combustion gas generated from the start combustor 52 (combustor) and supplied to the fuel cell stack 12 (fuel cell) becomes equal to or higher than the lower limit of the partial pressure at which the starvation of the cathode electrode of the fuel cell stack 12 (fuel cell) is avoidable. As a result, it is possible to set the target temperature $V(\lambda1(T))$ of the open circuit voltage to the vicinity of the lower limit value $V(\lambda a(T))$ of the open circuit voltage at which deterioration of the cathode is avoided depending on the temperature of the fuel cell stack 12.

The excess air factor $\lambda1(T)$ is set such that the oxygen partial pressure in the combustion gas generated from the start combustor 52 (combustor) and supplied to the fuel cell stack 12 (fuel cell) becomes the oxygen partial pressure at which the open circuit voltage (voltage) of the fuel cell stack 12 (fuel cell) is lowered under the discharge request voltage. As a result, it is possible to reliably lower the open circuit voltage of the fuel cell stack 12 at least under the discharge request voltage V1 using the combustion gas.

Stop Control of Second Embodiment

The second and subsequent embodiments have the basic configurations, the warm-up controls, and the normal power generation controls similar to those of the first embodiment, but the stop control is different from that of the first embodiment.

During the stop control, the fuel cell stack 12 radiates heat, and a heat radiation amount Q thereof increases as a difference between the temperature T of the fuel cell stack 12 and the atmospheric temperature Tc of the fuel cell stack 12 measured by the temperature sensor 76C increases. The heat radiation amount can be expressed as "Q(T-Tc)".

Therefore, in the case of the stop control, preferably, a total heat amount of the combustion gas and the anode gas does not exceed the heat radiation amount of the fuel cell stack 12 by setting the cathode gas supply amount Fcc supplied to the cathode and the combustion fuel supply amount Fcf supplied to the cathode to "Fcc[Q(T-Tc)]" and "Fcf[Q(T-Tc)]", respectively, and adjusting each supply amount depending on "Q(T-Tc)" in order to avoid a temperature increase of the fuel cell stack 12.

For example, if the heat radiation amount Q(T-Tc) becomes equal to or smaller than a predetermined value, a total heat amount of the combustion gas and the anode gas may be reduced while maintaining the oxygen partial pressures of the anode and the cathode by reducing each supply amount at the same ratio to predetermined amounts or reducing each supply amount at the same ratio in proportion to the reduction amount of the heat radiation amount Q(T-Tc).

Stop Control Sequence of Second Embodiment

Figure 6:
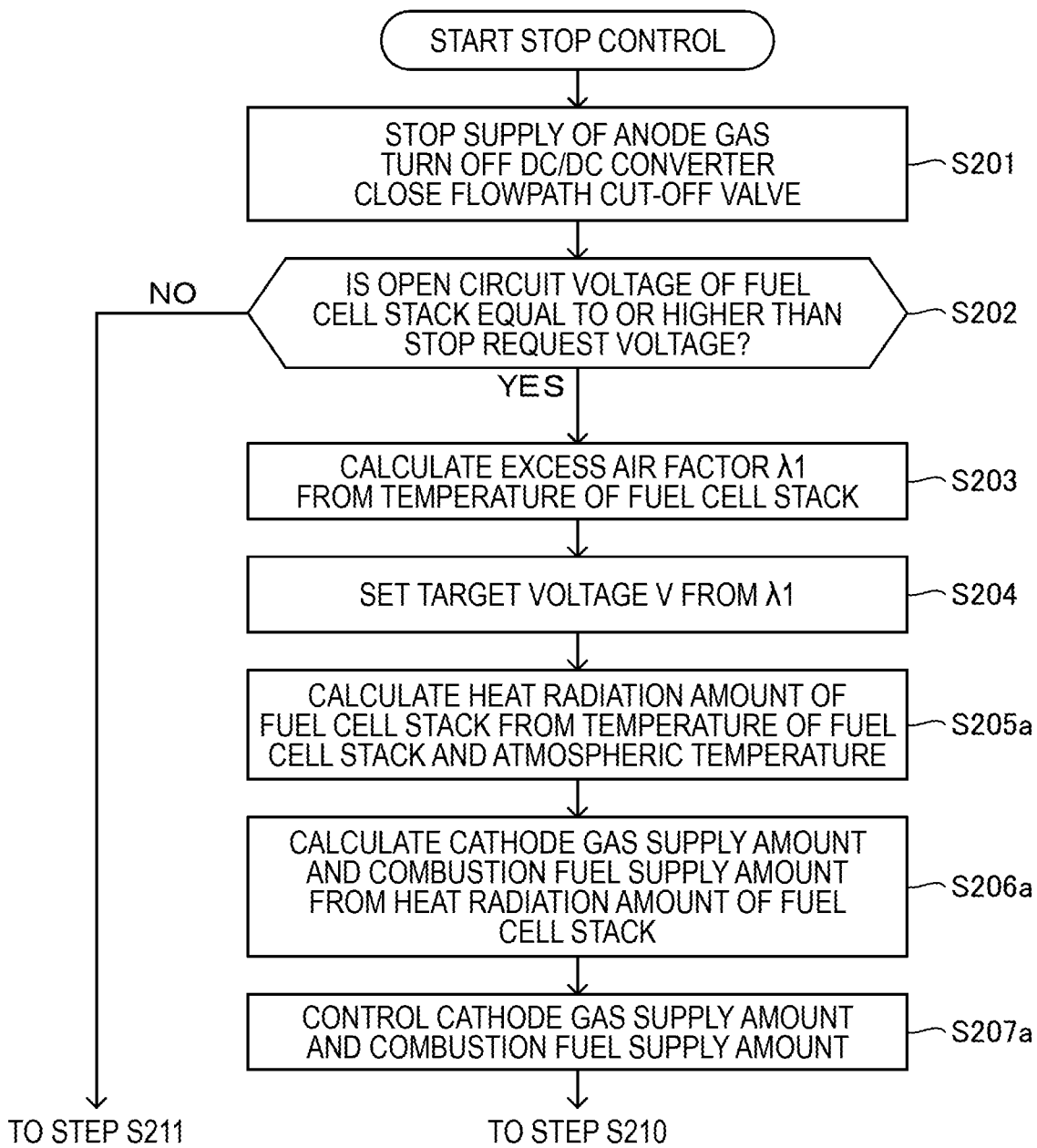
FIG. 6 is a flowchart illustrating a stop control sequence of a fuel cell system according to a second embodiment.

A stop control sequence of the fuel cell system according to the second embodiment will be described with reference to the flowchart of FIG. 6. The second embodiment is different from the first embodiment in that the cathode gas supply amount is adjusted on the basis of the heat radiation amount of the fuel cell stack 12. Note that, in the following description, the description of the common control with the first embodiment is omitted unless necessary.

As the system starts the stop control, similar to the first embodiment described above, steps S201, S202, S203, and S204 are executed.

After step S204, the heat radiation amount Q(T-Tc) of the fuel cell stack 12 is calculated from a difference between the temperature (internal temperature) of the fuel cell stack 12 measured by the temperature sensor 76A and the atmospheric temperature Tc of the fuel cell stack 12 measured by the temperature sensor 76B in step S205a.

In step S206a, the control unit 78 calculates the cathode gas supply amount Fcc and the combustion fuel supply amount Fcf from the heat radiation amount Q(T-Tc) and the excess air factor $\lambda1(T)$.

In step S207a, the control unit 78 controls the opening degree of the throttle 46A depending on the cathode gas supply amount Fcc to turn on the throttle 28B and the start combustor 52, and controls the opening degree of the throttle 28B depending on the combustion fuel supply amount Fcf.

As a result, as described above, the combustion gas of the excess air factor $\lambda1(T)$ flows through the passage 42A, the fuel cell stack 12, the passage 42D, and the exhaust passage 64, and the open circuit voltage of the fuel cell stack 12 decreases to the target voltage $V(\lambda1(T))$. Then, the process advances to step S210 by skipping steps S208 and S209 described above.

Effects of Second Embodiment

According to the second embodiment, the fuel cell system has the temperature sensor 76A (temperature detection unit) configured to estimate or detect the temperature of the fuel cell stack 12 (fuel cell) and the temperature sensor 76B (atmospheric temperature detection unit) configured to detect the atmospheric temperature of the fuel cell stack 12 (fuel cell). In addition, the control unit 78 (stop control unit) controls the cathode gas supply amount and the combustion fuel (fuel) supply amount on the basis of the heat radiation amount of the fuel cell stack 12 calculated from the temperature of the fuel cell stack 12 (fuel cell) and the atmospheric temperature. As a result, it is possible to avoid a temperature increase of the fuel cell stack 12 in the stop control.

Stop Control of Third Embodiment

A third embodiment aims to lower the open circuit voltage of the fuel cell stack 12 by continuously supplying the anode gas in the stop control and mixing oxygen with the anode gas at a predetermined partial pressure to reduce a difference of the oxygen partial pressure between the anode and the cathode of the fuel cell stack 12 and to avoid deterioration of the anode electrode by controlling the oxygen partial pressure of the anode gas.

As described above, the open circuit voltage of the fuel cell stack 12 depends on the difference of the oxygen partial pressure between the cathode and the anode. Therefore, the open circuit voltage can be lowered by reducing the oxygen partial pressure of the cathode and/or increasing the oxygen partial pressure of the anode. The oxygen partial pressure of the cathode can be reduced by supplying the combustion gas to the cathode using the warm-up control. The oxygen partial pressure of the anode may increase by increasing the reformation air supply amount supplied to the reformer 36 or the like.

Here, the excess air factor $\lambda$ ($\lambda 2$ described below) of the anode of the fuel cell stack 12 can be defined as a value that depends on "(reformation air supply amount)/(reformation fuel supply amount)". The excess air factor $\lambda$ becomes "1" considering the reformation air supply amount supplied to the reformer 36 and the maximum reformation fuel supply amount reformable by the reformation air (oxygen) corresponding to this supply amount. When the excess air factor $\lambda$ is equal to "1", the oxygen partial pressure in the anode gas becomes zero. However, as the excess air factor $\lambda$ increases over "1", the oxygen partial pressure increases.

The anode electrode of the fuel cell stack 12 is deteriorated (oxidized) when it is exposed to a predetermined oxygen partial pressure environment. In addition, an upper limit of the oxygen partial pressure for avoiding deterioration of the anode electrode is plotted as a curve that changes depending on the temperature and abruptly falls over a predetermined temperature (deterioration reaction temperature). Therefore, the excess air factor $\lambda 2(T)$ of the anode of the fuel cell stack 12 during the stop control and the excess air factor $\lambda c(T)$ at which an oxygen partial pressure for avoiding deterioration of the anode is implemented has a relationship "$1 \leq \lambda 2(T) \leq \lambda c(T)$".

According to the third embodiment, the setting of the excess air factor $\lambda 2(T)$ is obtained by controlling the opening degree of the throttle 28A configured to supply the reformation fuel when the opening degree of the throttle 46B configured to supply the reformation air is maximized. In this case, the reformation fuel supply amount Faf supplied to the anode becomes "Faf($\lambda 2(T)$, Facmax)" where "Facmax" denotes the cathode gas supply amount supplied to the anode. The open circuit voltage of the fuel cell stack 12 can be rapidly lowered by maximizing the supply amounts of the cathode gas flowing to the cathode and the reformation air flowing to the anode.

In the case of the stop control according to the third embodiment, since a predetermined partial pressure of oxygen exists in the anode gas, the target voltage V can be considered, for example, as a function "$V(\lambda 1(T) - \lambda 2(T) + 1)$". That is, if "$\lambda 1(T) = \lambda 2(T)$", the difference of the oxygen partial pressure between the cathode and the anode is removed. Therefore, it is possible to set the solution to zero "$V(1)=0$".

In a case where the open circuit voltage of the fuel cell stack 12 decreases to the target voltage $V(\lambda 1(T) - \lambda 2(T) + 1)$, the pump 24 and the compressor 40 are turned off, and the air supply cut-off valve 62A and the exhaust cut-off valve 62C are closed. Then, the fuel cell stack 12 may be naturally cooled by heat radiation.

Stop Control Sequence of Third Embodiment

Figure 7:
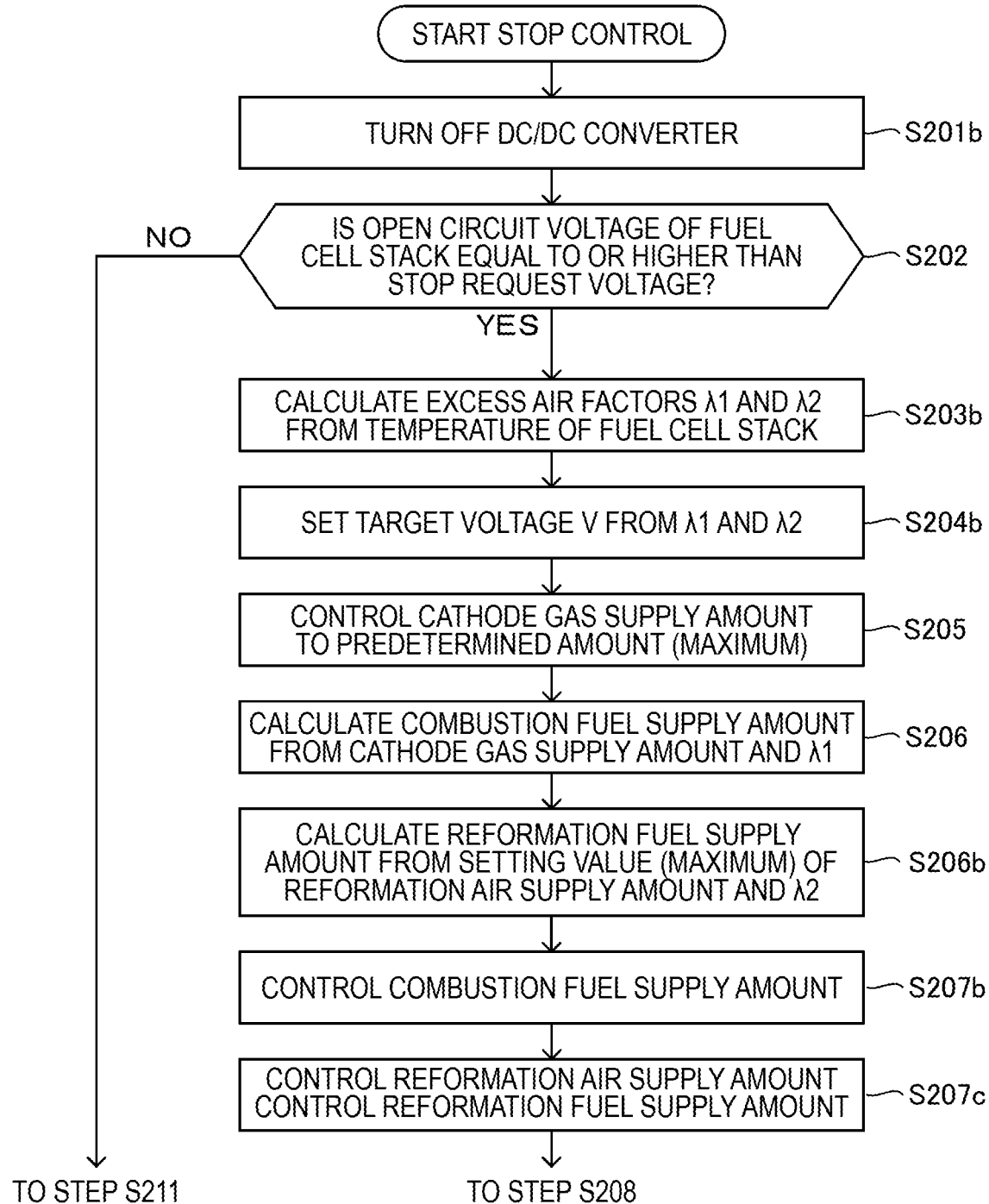
FIG. 7 is a flowchart illustrating a stop control sequence of a fuel cell system according to a third embodiment.

A stop control sequence of the fuel cell system according to the third embodiment will be described with reference to the flowchart of FIG. 7. As the system starts the stop control, in step S201b, the control unit 78 turns off the DC/DC converter 68 to stop power generation (supply of power) of the fuel cell stack 12, but the anode gas and the cathode gas are continuously supplied.

If the control unit 78 determines YES in step S202, the process advances to step S203b. Otherwise, if the control unit 78 determines NO, the process advances to step S211.

In step S203b, the control unit 78 calculates the excess air factor $\lambda 1(T)$ of the combustion gas generated from the start combustor 52 and the excess air factor $\lambda 2(T)$ of the anode gas on the basis of the temperature of the fuel cell stack 12 measured by the temperature sensor 76A.

In step S204b, the control unit 78 sets the target voltage "$V(\lambda 1(T) - \lambda 2(T) + 1)$" using the excess air factors $\lambda 1(T)$ and $\lambda 2(T)$. Then, similar to the first embodiment, the process advances to steps S205 and S206.

After step S206, the process advances to step S206b, where the control unit 78 calculates the reformation fuel supply amount Faf on the basis of the setting value (maximum) of the reformation air supply amount Fac of the stop control and the excess air factor $\lambda 2(T)$.

In step S207b, the control unit 78 turns on the throttle 28B and the start combustor 52 and controls the opening degree of the throttle 28B on the basis of the combustion fuel supply amount Fcf (step S206). As a result, as described above, the combustion gas of the excess air factor $\lambda 1(T)$ flows through the passage 42A, the fuel cell stack 12, the passage 42D, and the exhaust passage 64.

In step S207c, the control unit 78 controls the opening degree of the throttle 28A on the basis of the reformation fuel supply amount Faf, and controls the opening degree of the throttle 46B on the basis of the reformation air supply amount Fac. As a result, the anode gas of the excess air factor $\lambda 2(T)$ is supplied to the anode, and the open circuit voltage of the fuel cell stack 12 decreases to the target voltage $V(\lambda 1(T) - \lambda 2(T) + 1)$. In addition, the anode gas passing through the fuel cell stack 12 is mixed and combusted with the combustion gas in the exhaust combustor 58 to generate an exhaust gas, and the exhaust gas flows through the exhaust passage 64. Then, the process advances to step S208 described above.

Effects of Third Embodiment

The fuel cell system according to the third embodiment has the throttle 46B configured to supply the reformation air supplied to the anode of the fuel cell stack 12 (fuel cell). In addition, the control unit 78 (stop control unit) maximizes the reformation air supply amount of the throttle 46B (air supply unit). As a result, it is possible to supply the anode gas having a predetermined oxygen partial pressure.

The fuel cell system has the throttle 28A (reformation fuel supply unit) configured to supply the reformation fuel to the anode of the fuel cell stack 12 (fuel cell) and the temperature sensor 76A (temperature detection unit) configured to estimate or detect the temperature of the fuel cell stack 12 (fuel cell). In addition, the control unit 78 (stop control unit) controls the reformation fuel supply amount on the basis of the excess air factor $\lambda 2(T)$ corresponding to the temperature of the fuel cell stack 12 (fuel cell). As a result, it is possible to set the target temperature $V(\lambda 1(T) - \lambda 2(T) + 1)$ of the open circuit voltage of the fuel cell stack 12 depending on the temperature of the fuel cell stack 12 and the difference of the oxygen partial pressure between the cathode and the anode.

The excess air factor $\lambda 2$ is set such that the oxygen partial pressure in the anode is equal to or lower than the upper limit of the oxygen partial pressure at which deterioration of the anode electrode of the fuel cell stack 12 (fuel cell) is avoidable. As a result, it is possible to lower the open circuit voltage of the fuel cell stack 12 depending on the difference of the oxygen partial pressure between the cathode and the anode of the fuel cell stack 12 while avoiding deterioration of the anode.

When the open circuit voltage (voltage) of the fuel cell stack 12 (fuel cell) reaches the target voltage V(λ1(T)−λ2(T)+1) lower than the discharge request voltage, the control unit 78 (stop control unit) stops the throttle 28B (fuel supply unit), the throttle 46A (cathode gas supply unit), the throttle 28A, and the throttle 46B (air supply unit) and closes the air supply cut-off valve 62A and the exhaust cut-off valve 62C. As a result, after the stop control, the cathode and the anode are maintained in an airtight state, and oxygen partial pressures of the cathode and the anode are maintained. Therefore, it is possible to avoid deterioration of the cathode electrode and the anode electrode even when the fuel cell stack 12 is naturally cooled thereafter.

Stop Control Sequence of Fourth Embodiment

Figure 8:
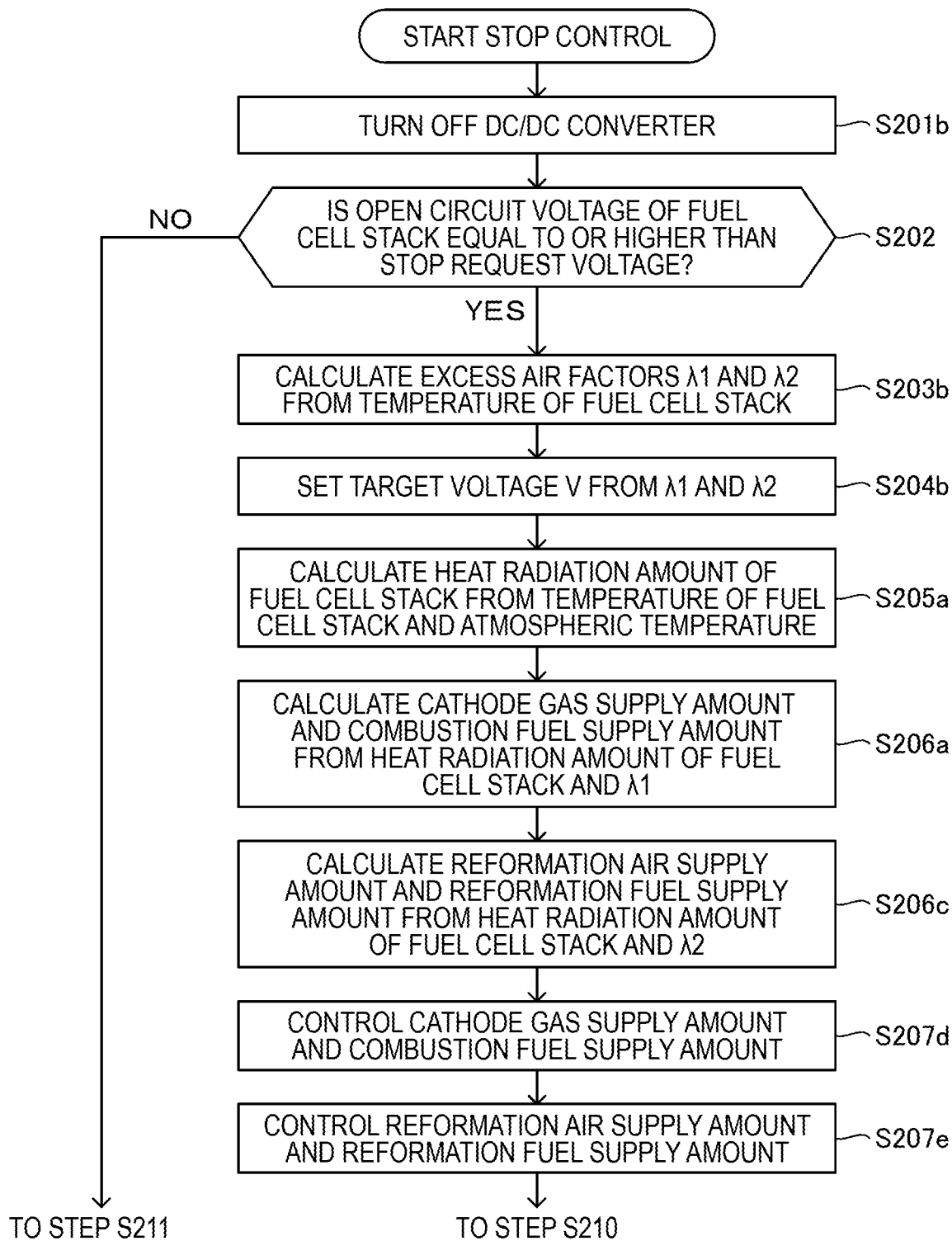
FIG. 8 is a flowchart illustrating a stop control sequence of a fuel cell system according to a fourth embodiment.

A stop control sequence of the fuel cell system according to the fourth embodiment will be described with reference to the flowchart of FIG. 8. According to the fourth embodiment, similar to the second embodiment, the combustion gas and the anode gas supply amount are adjusted on the basis of the heat radiation amount of the fuel cell stack 12 in the control of the third embodiment.

In the case of the stop control according to the fourth embodiment, preferably, a total heat amount of the combustion gas and the anode gas does not exceed the heat radiation amount of the fuel cell stack 12 by setting the cathode gas supply amount Fcc supplied to the cathode, the combustion fuel supply amount Fcf supplied to the cathode, the reformation air supply amount Fac supplied to the anode and the reformation fuel supply amount Faf supplied to the anode to Fcc[Q(T-Tc)], Fcf[Q(T-Tc)], Fac[Q(T-Tc)], and Faf[Q(T-Tc)], respectively, and adjusting each supply amount depending on the "Q(T-Tc)" in order to avoid a temperature increase of the fuel cell stack 12.

Similar to the third embodiment, as the system start the stop control, the control unit 78 sequentially executes steps S201*b*, S202, S203*b*, and S204*b*. Then, similar to the second embodiment, the control unit 78 executes steps S205*a* and S206*a*.

After step S206*a*, the process advances to step S206*c*, where the control unit 78 calculates the reformation air supply amount Fac and the reformation fuel supply amount Faf on the basis of the heat radiation amount Q(T-Tc) and the excess air factor λ2(T).

In step S207*d*, the control unit 78 controls the opening degree of the throttle 46A on the basis of the cathode gas supply amount Fcc and controls the opening degree of the throttle 28B on the basis of the combustion fuel supply amount Fcf. In step S207*e*, the control unit 78 controls the opening degree of the throttle 46B on the basis of the reformation air supply amount Fac, and controls the opening degree of the throttle 28A on the basis of the reformation fuel supply amount Faf. Through steps S207*d* and S207*e*, similar to the third embodiment, the open circuit voltage of the fuel cell stack 12 decreases to the target voltage V(λ1(T)−λ2(T)+1). Then, the process advances to step S210.

Effects of Fourth Embodiment

The fuel cell system according to the fourth embodiment has the temperature sensor 76A (temperature detection unit) configured to estimate or detect the temperature of the fuel cell stack 12 (fuel cell) and the temperature sensor 76B (atmospheric temperature detection unit) configured to detect an atmospheric temperature of the fuel cell stack 12 (fuel cell). In addition, the control unit 78 (stop control unit) controls the cathode gas supply amount, the combustion fuel (fuel) supply amount, the reformation air supply amount, and the reformation fuel supply amount on the basis of the heat radiation amount calculated from the temperature of the fuel cell stack 12 (fuel cell) and the atmospheric temperature. As a result, it is possible to avoid a temperature increase of the fuel cell stack 12 in the stop control.

The combustion gas supply amount and the anode gas supply amount are controlled on the basis of the heat radiation amount Q(T-Tc) of the fuel cell stack 12 in the second and fourth embodiments. However, in a case where the temperature of the fuel cell stack 12 increases over a predetermined temperature (heat-resisting temperature) in spite of such a control, the control of steps S208 and S209 of FIG. 3 may be performed.

In the stop control of any embodiment, the target voltage V is set to be slightly higher than "V(λa(T))". For this reason, the target voltage V changes depending on the temperature of the fuel cell stack 12. However, the target voltage V may be set to any voltage within a range "V(λa(T))<V<V1 (discharge request voltage)". For example, in a case where the target voltage V is set to an intermediate voltage range between V(λa(T)) and V1, there is no change in the relationship between V(λa(T)) and the target voltage V regardless of a temperature variation of V(λa(T)). Therefore, in this case, the target voltage V can be fixed to a predetermined voltage value within this intermediate voltage range. In addition, in the stop control of the fuel cell stack 12, the cathode gas supply amount from the throttle 46A can be set (fixed) to a predetermined amount regardless of the temperature of the fuel cell stack 12, and the combustion fuel supply amount (fixed) corresponding to the cathode gas supply amount can be supplied to the throttle 28B. That is, the excess air factor λ can be fixed to a predetermined value that does not depend on the temperature of the fuel cell stack 12. This predetermined value may be set to a value that converges the open circuit voltage of the fuel cell stack 12 to the target voltage V or a value that converges a predetermined voltage higher than V(λa(T)) and lower than the target voltage V.

While the embodiments of the invention have been described hereinbefore, they are merely for illustrative purposes to describe a part of applications of the invention, and are not intended to limit the technical scope of the invention to such specific embodiments described above.

This application claims a priority based on a Japanese patent application No. 2015-254188 filed with the Japanese Patent Office on Dec. 25, 2015, the entire contents of which application is incorporated herein by reference.

The invention claimed is:

1. A solid oxide fuel cell system comprising:
   a solid oxide fuel cell;
   a combustor disposed in a cathode gas supply line of the fuel cell;
   a fuel supply unit configured to supply a fuel to the combustor;
   a cathode gas supply unit configured to supply a cathode gas to the cathode gas supply line; and
   a control unit programmed to perform a stop control, in response to a stop of the fuel cell, including a control that sets a cathode gas supply amount from the cathode gas supply unit to a predetermined amount and a control that supplies the fuel from the fuel supply unit in a supply amount corresponding to the cathode gas supply amount such that a combustion gas having an oxygen partial pressure equal to or higher than a predetermined partial pressure that can avoid deterioration of a cathode electrode flows through the cathode gas supply line.

2. The solid oxide fuel cell system according to claim 1, further comprising a voltage detection unit configured to detect a voltage of the fuel cell,
wherein the control unit is programmed to perform the stop control when the voltage of the fuel cell is equal to or higher than a discharge request voltage.

3. The solid oxide fuel cell system according to claim 2, further comprising:
an air supply cut-off valve installed in the cathode gas supply line; and
an exhaust cut-off valve installed in an exhaust line through which an exhaust gas from the fuel cell is discharged,
wherein the control unit is programmed to stop the fuel supply unit and the cathode gas supply unit, and close the air supply cut-off valve and the exhaust cut-off valve, when the voltage of the fuel cell decreases to a predetermined target voltage lower than the discharge request voltage.

4. The solid oxide fuel cell system according to claim 1, further comprising a temperature detection unit configured to estimate or detect a temperature of the fuel cell,
wherein the control unit is programmed to reduce the cathode gas supply amount and the fuel supply amount when the temperature of the fuel cell increases to or above a predetermined temperature.

5. The solid oxide fuel cell system according to claim 4, wherein the predetermined temperature is set to a heat-resisting temperature of the fuel cell.

6. The solid oxide fuel cell system according to claim 1, further comprising:
a temperature detection unit configured to estimate or detect a temperature of the fuel cell; and
an ambient temperature detection unit configured to detect an ambient temperature of the fuel cell,
wherein the control unit is programmed to control the fuel supply amount on the basis of a heat radiation amount of the fuel cell calculated from the temperature of the fuel cell and the ambient temperature.

7. The solid oxide fuel cell system according to claim 1, wherein the control unit is programmed to maximize the cathode gas supply amount from the cathode gas supply unit.

8. The solid oxide fuel cell system according to claim 7, further comprising a temperature detection unit configured to estimate or detect a temperature of the fuel cell,
wherein the control unit is programmed to control the fuel supply amount on the basis of an excess air factor $\lambda 1$ corresponding to the temperature of the fuel cell.

9. The solid oxide fuel cell system according to claim 8, wherein the excess air factor $\lambda 1$ is set such that the oxygen partial pressure of the combustion gas generated from the combustor and supplied to the fuel cell becomes equal to or higher than a lower limit partial pressure at which starvation of a cathode electrode of the fuel cell is avoidable.

10. The solid oxide fuel cell system according to claim 9, wherein the excess air factor $\lambda 1$ is set such that the oxygen partial pressure of the combustion gas generated from the combustor and supplied to the fuel cell becomes an oxygen partial pressure at which the voltage of the fuel cell is lower than a discharge request voltage.

11. The solid oxide fuel cell system according to claim 1, further comprising an air supply unit configured to supply a reformation air supplied to an anode of the fuel cell,
wherein the control unit is programmed to maximize a reformation air supply amount of the air supply unit.

12. The solid oxide fuel cell system according to claim 11, further comprising:
a reformation fuel supply unit configured to supply a reformation fuel to the anode of the fuel cell; and
a temperature detection unit configured to estimate or detect a temperature of the fuel cell,
wherein the control unit is programmed to control a reformation fuel supply amount on the basis of an excess air factor $\lambda 2$ corresponding to the temperature of the fuel cell.

13. The solid oxide fuel cell system according to claim 12, wherein the excess air factor $\lambda 2$ is set such that an oxygen partial pressure of the anode becomes equal to or lower than an upper limit of the oxygen partial pressure at which deterioration of the anode electrode of the fuel cell is avoidable.

14. The solid oxide fuel cell system according to claim 11, further comprising:
an air supply cut-off valve installed in the cathode gas supply line; and
an exhaust cut-off valve installed in an exhaust line through which an exhaust gas from the fuel cell is discharged,
wherein the control unit is programmed to stop the fuel supply unit, the cathode gas supply unit and the air supply unit, and close the air supply cut-off valve and the exhaust cut-off valve, when a voltage of the fuel cell reaches a target voltage lower than a discharge request voltage.

15. A method of controlling a solid oxide fuel cell system, the method performing a stop control, in response to stop of a solid oxide fuel cell, including the steps of:
generating a combustion gas by supplying a fuel and a cathode gas to a combustor disposed in a cathode gas supply line of the fuel cell; and
supplying the combustion gas to the fuel cell,
wherein, in the generating the combustion gas, a cathode gas supply amount is set to a predetermined amount, and the fuel is supplied to the combustor in a supply amount corresponding to the cathode gas supply amount such that the combustion gas having an oxygen partial pressure equal to or higher than a predetermined partial pressure that can avoid deterioration of a cathode electrode flows through the cathode gas supply line.

16. The method according to claim 15, wherein the stop control is performed when a voltage of the fuel cell is equal to or higher than a discharge request voltage.

17. The method according to claim 16, further comprising, when the voltage of the fuel cell decreases to a predetermined target voltage lower than the discharge request voltage, stopping the supply of the fuel and the cathode gas, and closing an air supply cut-off valve and an exhaust cut-off valve, the air supply cut-off valve being installed in the cathode gas supply line and the exhaust cut-off valve being installed in an exhaust line through which an exhaust gas from the fuel cell is discharged.

* * * * *